United States Patent
Jorgensen et al.

(10) Patent No.: US 8,837,693 B2
(45) Date of Patent: Sep. 16, 2014

(54) METHOD FOR MINIMIZING MESSAGE COLLISION IN A DEVICE

(75) Inventors: Niels Erik Jorgensen, Greve (DK); Michael Christoffersen, Frederiksberg (DK)

(73) Assignee: Motorola Solutions, Inc., Schaumburg, IL (US)

( * ) Notice: Subject to any disclaimer, the term of this patent is extended or adjusted under 35 U.S.C. 154(b) by 197 days.

(21) Appl. No.: 13/450,951

(22) Filed: Apr. 19, 2012

(65) Prior Publication Data

US 2012/0201364 A1 Aug. 9, 2012

Related U.S. Application Data

(63) Continuation of application No. 12/212,797, filed on Sep. 18, 2008.

(51) Int. Cl.
*H04M 1/64* (2006.01)
*H04L 29/06* (2006.01)

(52) U.S. Cl.
CPC .......... *H04L 65/4061* (2013.01); *H04L 65/605* (2013.01); *H04L 65/80* (2013.01)
USPC ................ 379/88.22; 379/93.08; 379/211.02; 370/237; 704/502

(58) Field of Classification Search
USPC ............... 379/67.1–69, 88.25, 93.08, 211.02; 709/229, 239; 370/389, 237; 455/503, 455/18; 704/502; 342/172
See application file for complete search history.

(56) References Cited

U.S. PATENT DOCUMENTS

| | | |
|---|---|---|
| 5,541,589 A | 7/1996 | Delaney |
| 5,740,235 A | 4/1998 | Lester |

(Continued)

OTHER PUBLICATIONS

Zinser, et al. 2.4KB/SEC Compressed Domain Teleconference Bridge With Universal Transcoder, General Electric Corporate Research and Development, Niskayuna, NY, 2001 IEEE.

(Continued)

*Primary Examiner* — Md S Elahee
(74) *Attorney, Agent, or Firm* — Daniel R. Bestor; Kenneth A. Haas (57) ABSTRACT

A method for minimizing message collision in a device is presented. Two or more overlapping real-time streaming simplex audio messages are received. One of the audio messages is forwarded to be reproduced while the other is stored. Forwarding of the delayed audio message is delayed such that overlapping reproduction of the audio messages is minimized. Reproduction is delayed until a predetermined clock time expires or is dependent on one or more of: the length of the second audio message or the amount of overlap of the first and second audio messages.

14 Claims, 9 Drawing Sheets

(56) References Cited

U.S. PATENT DOCUMENTS

| | | | |
|---|---|---|---|
| 6,035,206 | A | 3/2000 | Thurston et al. |
| 6,230,130 | B1 | 5/2001 | Castello da Costa |
| 6,360,093 | B1 | 3/2002 | Ross |
| 7,027,989 | B1 | 4/2006 | Tapadar |
| 7,090,582 | B2 | 8/2006 | Danieli |
| 7,113,514 | B2 | 9/2006 | Tahernezhaadi |
| 7,130,309 | B2 | 10/2006 | Planka |
| 7,203,285 | B2 | 4/2007 | Blair |
| 7,263,545 | B2 | 8/2007 | Digate |
| 7,280,133 | B2 | 10/2007 | Lord |
| 2003/0140149 | A1* | 7/2003 | Marejka et al. ............... 709/229 |
| 2004/0156360 | A1* | 8/2004 | Sexton et al. ............... 370/389 |
| 2006/0120350 | A1 | 6/2006 | Olds |
| 2006/0153163 | A1 | 7/2006 | James |
| 2006/0258336 | A1 | 11/2006 | Sajor |
| 2006/0281419 | A1 | 12/2006 | Peplinski et al. |

OTHER PUBLICATIONS http://www.etymotic.com/ephp/compmic.aspx.
Non Final Office Action mailed on Jan. 10, 2012 in counterpart U.S. Appl. No. 12/212,797, Niels Erik Jorgensen, filed Sep. 18, 2008.
Final Office Action mailed on Jun. 28, 2012 in counterpart U.S. Appl. No. 12/212,797, Niels Erik Jorgensen, filed Sep. 18, 2008.
Notice of Allowance mailed on Aug. 31, 2012 in counterpart U.S. Appl. No. 12/212,797, Niels Erik Jorgensen, filed Sep. 18, 2008.
Final Rejection Dated Jun. 28, 2012 for U.S. Appl. No. 12/212,797.

* cited by examiner

METHOD FOR MINIMIZING MESSAGE COLLISION IN A DEVICE

The present invention is a continuation application of U.S. patent application Ser. No. 12/212,797 filed in the United States Patent Office on Sep. 18, 2008, the entire contents of which are incorporated herein by reference.

FIELD OF THE DISCLOSURE

The present disclosure relates generally to message reception in a device and more particularly to a method for minimizing collisions between messages during reception.

BACKGROUND

In a dispatch environment, a number of real-time audio messages may be received at the same time (i.e., temporally overlapping) in a single device. During simultaneous reception, individual messages become difficult to comprehend as the audio signals collide at the receiving system, which are summed by the receiving system and reproduced at the same time.

Some systems, such as those using Push-to-Talk (PTT) technology avoid this problem entirely. PTT technology differs from conventional voice networks in allowing audio from only one audio source to be forwarded at a given time. Only one audio source controls the "floor" at any given time, and control is typically achieved when one source releases control and another source assumes the control. Thus, overlapping messages from different audio sources on the selected channel are not permitted to be transmitted. Other systems employ techniques that are generally complicated and expensive.

It is desirous in certain situations, especially those involving emergency services, to have all real-time messages be received properly, even if the messages collide, and messages be delivered proactively in a narrow range of time. Further, large scale disasters result in numerous messages being generated within a very short period. All of these messages should to be received and processed rapidly, so that emergency services can be provided as soon as possible.

Accordingly, there remains a need for a method that minimizes real-time message collision in a device and also addresses at least some of the shortcomings of past and present techniques.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, the following description sets out a number of embodiments of a method for minimizing real-time message collision in a dispatch receiver or similar device subject to message collision. In general, these embodiments begin with the receiver receiving two or more overlapping real-time streaming simplex audio messages. A first audio message is forwarded to reproduction components of the receiver while a second audio message is stored. Forwarding of the second audio message to the reproduction components is delayed such that the forwarding of the second audio message commences at a selected time that is a predetermined clock time. Alternatively, the selected time is dependent on the length of the second audio message and/or the amount of overlap of the first and second audio messages. The timing of when the first and second audio messages are received and subsequent order of reproduction the messages are variable and may be dependent, for example, on the priorities of the overlapping messages.

Figure 1:
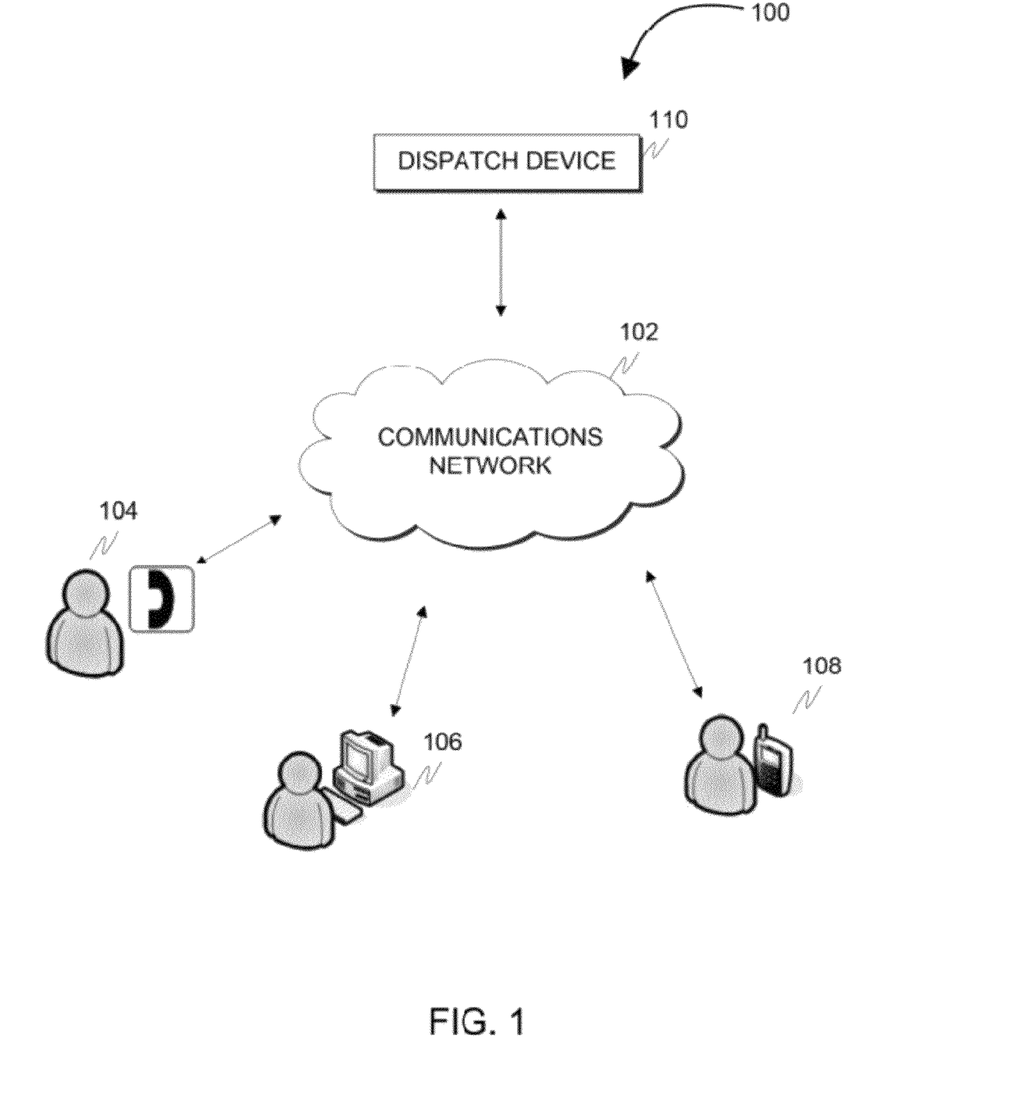
FIG. 1 is a block diagram of an example dispatch environment in accordance with some embodiments.

FIG. 1 is a block diagram of an example dispatch environment 100, suitable for the implementation of embodiments of the claimed invention. The dispatch environment 100 includes a communication network 102, which can be implemented using any of the various technology solutions available to those in the art. Examples of suitable technologies include Public Switched Telephone Network (PSTN), a computer network (for example, the Internet, Local Area Network (LAN), Metropolitan Area Network (MAN)), a wireless network (for example—Wireless Fidelity (Wi-Fi), Worldwide Interoperability for Microwave Access (WiMAX), Global System for Mobile Communications (GSM), Personal Communications Service (PCS) and Digital Advanced Mobile Phone Service (D-AMPS)). It should be noted that the type of network will be chosen by those in the art based on specific needs of the communications application. Additionally, it is anticipated that technological development will bring other networks or communication systems into use in the future, and that those solutions may be deployed in connection with the claimed invention, which is not limited in any way by the network technology. Various audio sources 104, 106, and 108 transmit audio messages over the communication network 102 to a dispatch device 110. The audio sources 104, 106, and 108 may be mobile or stationary communication devices, for example.

This type of environment is found in any number of areas in which a number of subscribers communicate with a central dispatch center. The dispatch center is responsible for receiving calls and taking appropriate action. Police or firefighting organizations epitomize this situation in the public service sector, and taxicab companies provide a classic example in private organizations. The same problem is faced in situations where a number of subscribers are actually members of the public, as seen in emergency dial-in services (so-called "911" telephone centers) or similar hotline services. All of these services share the problem that numbers of messages can arrive simultaneously, and all incoming messages must be handled quickly and accurately.

The audio messages may be machine or human generated. For example, in an emergency situation such as a fire, people may call for emergency services or fire alarms may be configured to send audio messages to convey the location of the fire. Intrusion detection systems are often configured to automatically place a call to the local police station, for example. The dispatch device 110 dispatches the received audio messages, as explained in detail in connection with FIG. 2 below. It should be further understood that the term "audio message" as used here includes any message that provides content in aural form, whether that message is communicated as a pure audio signal (e.g., a conventional telephone signal) or is combined with, or modulated onto, a higher-frequency signal carrier, such as a radio signal or video signal.

Figure 2:
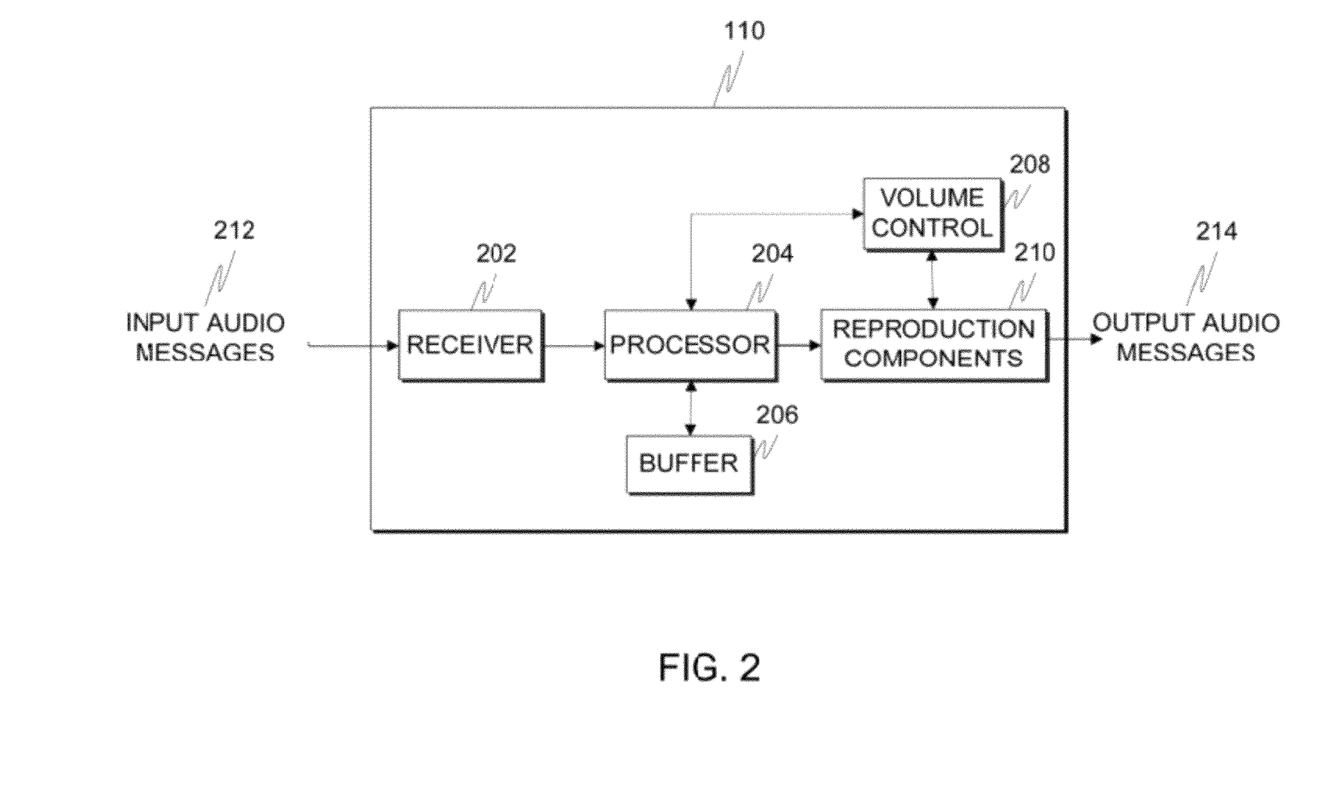
FIG. 2 is a block diagram of a dispatch device in accordance with some embodiments.

FIG. 2 is a block diagram an embodiment of the dispatch device 110. The dispatch device 110 includes a receiver 202, a processor 204, a buffer 206, a volume controller 208 and reproduction components 210. The receiver 202 receives overlapping real-time streaming input audio messages 212 transmitted by the audio sources 104, 106, and 108 over the communication network 102. The input audio messages 212 may be short real-time audio messages. The dispatch device 110 can be chosen from among the conventional solutions available to those in the art for such applications, selected to fit specific system criteria. It will be clear to those in the art that the claimed invention is applicable to the broad range of conventional dispatch system technologies, and it is anticipated that technologies developed in the future will similarly support implementation of the claimed invention. Examples of conventional dispatch systems include radio networks such as TErrestrial Trunked RAdio (TETRA) or ASTRO.

The processor 204 forwards the input audio messages to the reproduction components 210 where the audio messages are reproduced so that they are audible to a dispatcher. The volume controller 208 may be used by the processor 204 to control the volume of output audio messages 214 being reproduced by the reproduction components 210. The volume controller 208 may be an automatic playback volume control that sets reproduction volume of the audio messages at different levels when forwarded audio messages overlap. The different levels may be based on the sequence in which the audio messages are received such that messages received earlier, for example, are played at a higher volume than ones received later. Alternatively, the levels may be based on the priority of audio messages (if a priority is associated with the received messages) such that messages with higher priority are reproduced at a higher volume than ones with lower priority. The volume controller 208 may also be set manually by a user.

The processor 204 may store input audio messages or portions of the input audio messages in the buffer 206. At an appropriate time, the processor 204 may retrieve the input audio messages or portions of the input audio messages stored in the buffer 206 and forward them to the reproduction components 210. The processor 204 may forward the audio messages to the reproduction components at a predetermined clock time, after forwarding has been completed, or after the buffer 206 has been filled.

Figure 3:
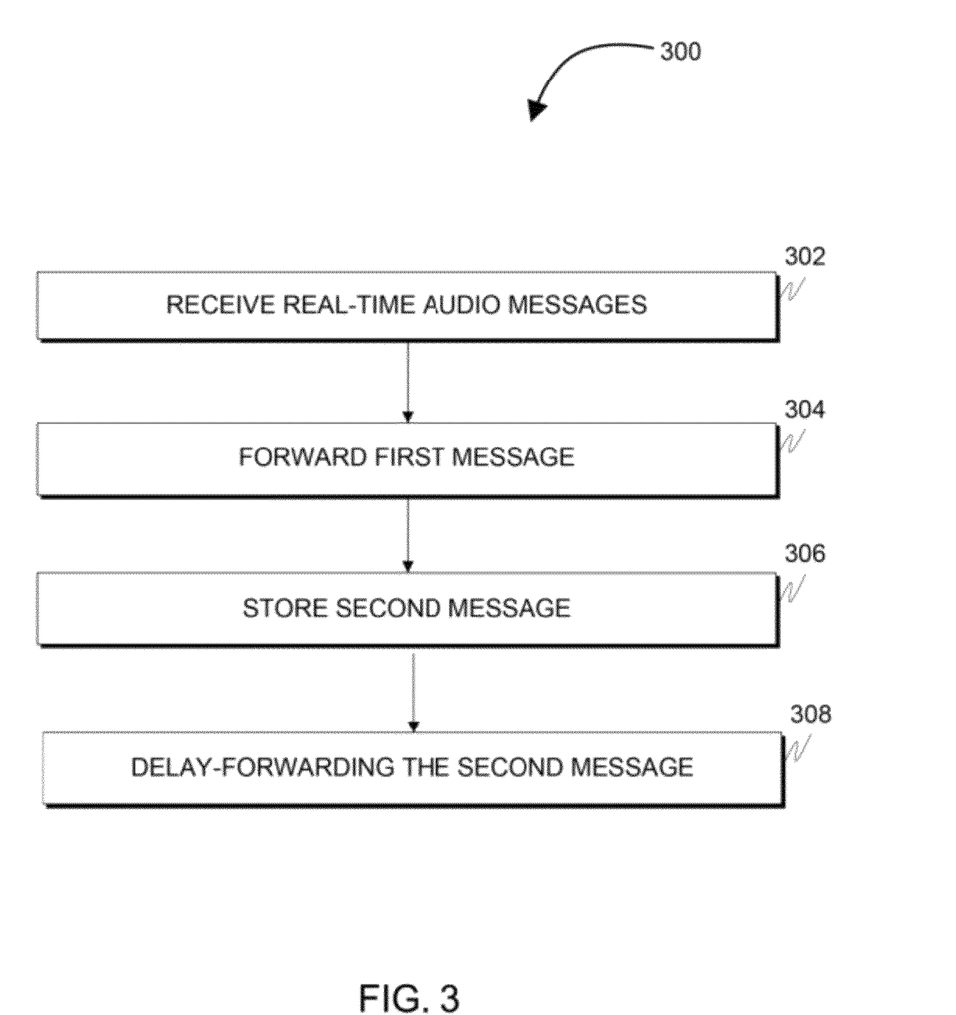
FIG. 3 is a flowchart of a method for minimizing message collision in the dispatch device in accordance with some embodiments.

A flowchart 300 of one embodiment for minimizing message collision in the dispatch device 110 in accordance with the claimed invention is shown in FIG. 3. At step 302, the receiver 202 receives multiple overlapping real-time streaming simplex audio messages from the audio sources 104, 106, and 108. The audio messages are simplex audio messages as they flow in one direction; that is, from the audio sources 104, 106, and 108 to the dispatch device 110. Thereafter, the processor 204 forwards a first audio message to the reproduction components 210 of the dispatch device 110 at step 304. The processor 204 may forward the audio messages after processing them, by performing operations such as equalization, audio cleaning, noise cancellation, and automatic gain control.

A second audio message, received subsequent to the first audio message, is stored by the processor 204 at step 306 in the buffer 206. In one embodiment, the processor 204 stores at least a portion of the second audio message in the buffer 206. In various embodiments, audio messages from different sources are stored in different buffers in the dispatch device 110 or different sections or partitions of the buffer 206.

Continuing, at step 308, the processor 204 delays forwarding the second audio message to the reproduction components until a selected time. The selected time may be a predetermined clock time, such as several seconds to about a minute after forwarding of the first audio message begins. The selected time may alternatively or in addition depend on factors such as the length of the second audio message or the overlap between messages as will be described in more detail below.

The selected time may alternatively be the first to occur of different events. These events include, for example, expiration of a fixed clock period after forwarding of the first audio message has started, expiration of a preset clock period following the end of forwarding of the first audio message, or a maximum delay period dependent on the length of the second audio message and the amount of overlap of the first and second audio messages. The maximum delay period may be, for example, the time the buffer 206 takes to fill.

Note that the terms "selected time," "selected clock period," "fixed clock period," and "preset clock period" all denote absolute clock times. In one example, the length of the first audio message is 20 seconds, the fixed clock period is 25 seconds, the preset clock period is 1 second, and the maximum delay period is 30 seconds. The processor 204 forwards the first audio message to the reproduction components 210 and then calculates which occurs first: the fixed clock period (completed after forwarding the first audio message begins=25 seconds); the preset clock period (completed after forwarding the first audio message ends=21 seconds); or the maximum delay period (=30 seconds). In this case, the processor 204 forwards the second audio message 21 seconds after beginning to forward the first audio message. In other embodiments, the last event can be chosen or an event between the first and last events can be chosen as a balance therebetween.

The selected time, the selected clock period, the fixed clock period, the preset clock period and the maximum delay period, or other control parameters may be selected manually by a user using controls provided on the dispatch device 110. Alternatively, these parameters can be automatically selected based on rules defined by a user or a group, or for a device or a server. User-defined or group-defined rules are effective when the identified user or member of the identified group sends or receives audio messages. Device-defined or server-defined rules are effective when the identified device or server is used to receive or forward audio messages. The contents of such rules, as well as the specific means for implementing them, will be clear to those of skill in the art and need not be explained here.

FIGS. 4-8 below set out exemplary situations where embodiments of the method set out in FIG. 3 are used to forward audio messages such that they are intelligible to a listener.

Figure 4:
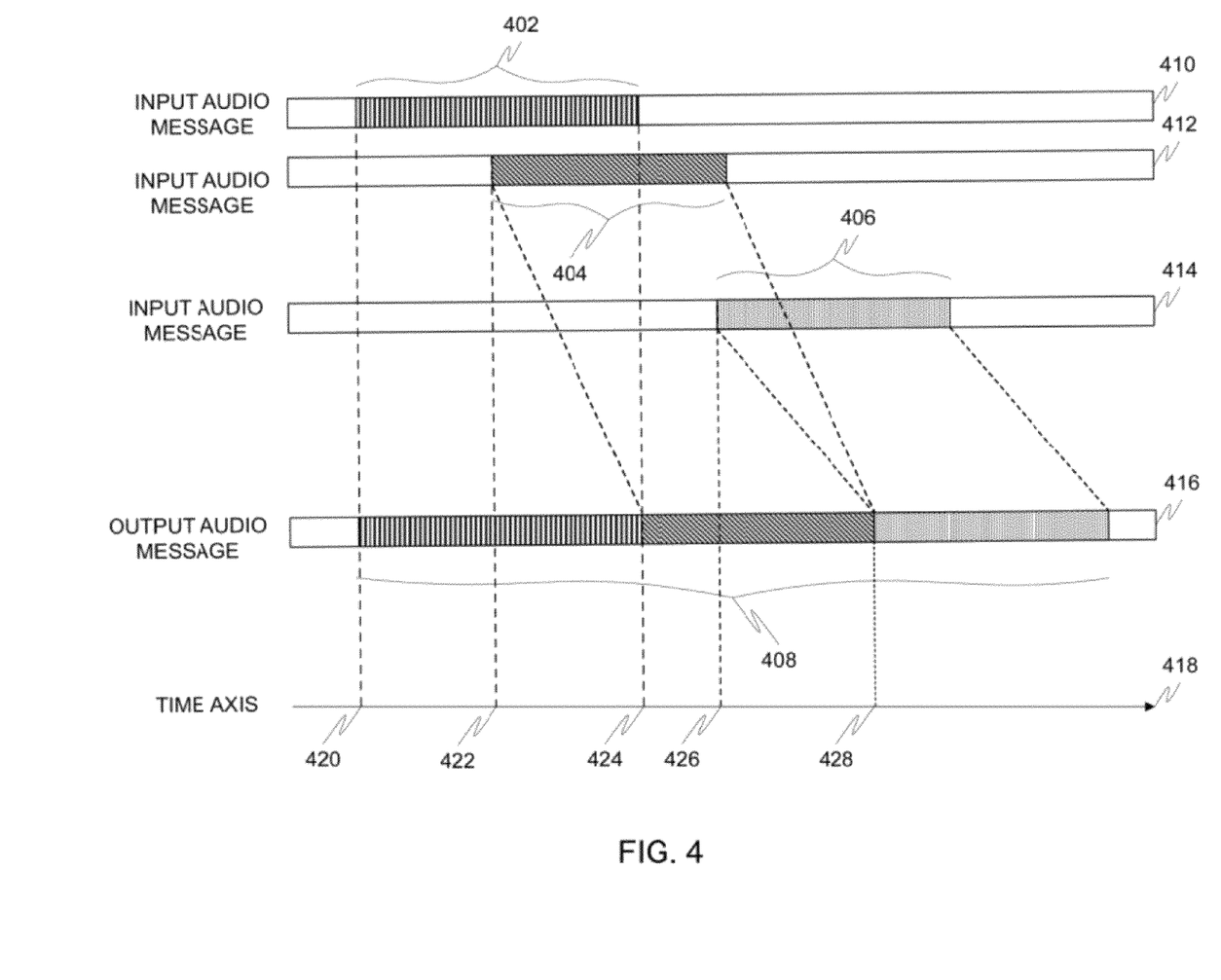
FIG. 4 sets out a diagram corresponding to an exemplary situation showing input audio messages and output audio messages in accordance with some embodiments.

FIG. 4 sets out a diagram showing the operation of an embodiment of the claimed invention in which the dispatch device 110 receives overlapping audio messages and forwards them one after another by storing overlapping portions of the messages. The dispatch device 110 receives overlapping audio messages 402, 404, and 406 from the audio sources 104, 106, and 108 respectively and forwards output messages 408. Bars 410, 412, 414 correspond to the audio messages received from the audio sources 104, 106, and 108 respectively. Similarly, a bar 416 corresponds to the output audio messages 408 forwarded to the reproduction components and reproduced thereat. A time axis 418 shows timings corresponding to the audio messages.

The receiver 202 receives the audio message 402 at time 420 from the audio source 104, and the processor 204 forwards the audio message 402 to the reproduction components 210, as shown in the bar 416. Although the delay between reception and forwarding of the audio message 402 is shown in the figures as negligible for convenience (thus the output audio shown in bar 416 is illustrative of both the forwarded and reproduced audio output), this delay may be non-negligible on the time scale shown in FIGS. 4-8. At time 422, the receiver 202 receives the audio message 404 and the processor 204 stores the audio message 404 in the buffer 206 while the audio message 402 is being reproduced. At time 424, the audio message 402 has been reproduced in its entirety; thereafter, the processor 204 forwards the audio message 404 from the buffer 206 to the reproduction components 210.

Continuing, at time 426, the receiver 202 receives the audio message 406 and the processor 204 stores the audio message 406 in the buffer 206 while the audio message 404 is being reproduced. At time 428, the audio message 404 has been reproduced in its entirety; thereafter, the processor 204 forwards the audio message 406 from the buffer 206 to the reproduction components 210 such that a listener hears the output audio message 408 as containing the audio messages 402, 404, and 406 in succession. Note that although audio messages 402, 404, and 406 are shown in the output audio message 408 as being reproduced immediately one after another, they may be separated such that there is a distinct time gap between the two to permit a listener to more readily discern the difference between the messages. Whether or not a time gap is present, an audible indicator, such as a beep, chime, or bell, may be provided between messages in all embodiments described herein. Such an indicator may be preset or may be programmable by the user.

Figure 5:
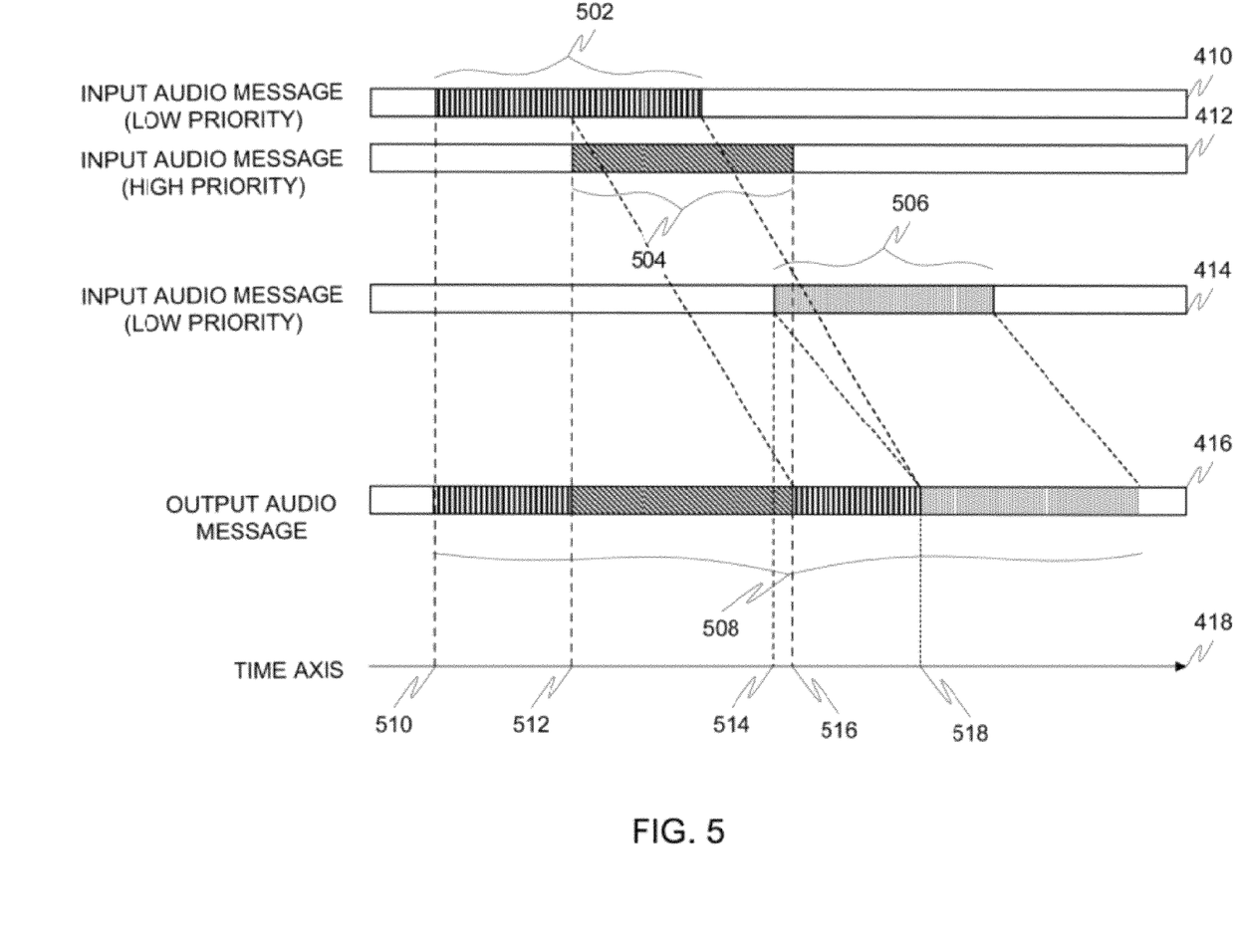
FIG. 5 sets out a diagram corresponding to an exemplary situation showing input audio messages and output audio messages in accordance with some embodiments.

FIG. 5 diagrams the operation of an embodiment of the claimed invention in which the dispatch device 110 receives overlapping audio messages having an associated priority and forwards one message at a time based on the associated priority. Messages with lower priority are pre-empted by messages with higher priority, while remaining portion of lower priority messages are stored and forwarded later. The dispatch device 110 receives overlapping audio messages 502, 504, and 506 from the audio sources 104, 106, and 108 respectively and forwards them to create the output audio message 508.

More specifically, the receiver 202 receives the audio message 502 at time 510 from the audio source 104 and the processor 204 forwards the audio message 502 to the reproduction components 210. At time 512, the receiver 202 receives the audio message 504. The priority of the audio message 504 is higher than that of the audio message 502, and therefore the processor 204 preempts the audio message 502 with the audio message 504 by forwarding the audio message 504 to the reproduction components 210. The processor 204 simultaneously stops forwarding the audio message 502 and starts storing the remaining part of the audio message 502 in the buffer 206. The interruption can be preceded by a short time gap and/or, as above, may be provided with an audible indicator that indicates the message is being interrupted for a higher priority message.

At time 514, the receiver 202 receives the audio message 506, and the processor 204 stores the audio message 506 in the buffer 206 while the audio message 504 is being reproduced. Next, at time 516, the audio message 504 has been reproduced in its entirety. Thereafter, the processor 204 forwards the remaining part of the audio message 502 from the buffer 206 to the reproduction components 210. At time 518, the audio message 502 has been reproduced in its entirety; thereafter, the processor 204 forwards the audio message 506 from the buffer 206 to the reproduction components 210 such that a listener hears the audio messages 502, 504, and 506 based on their priority.

Figure 6:
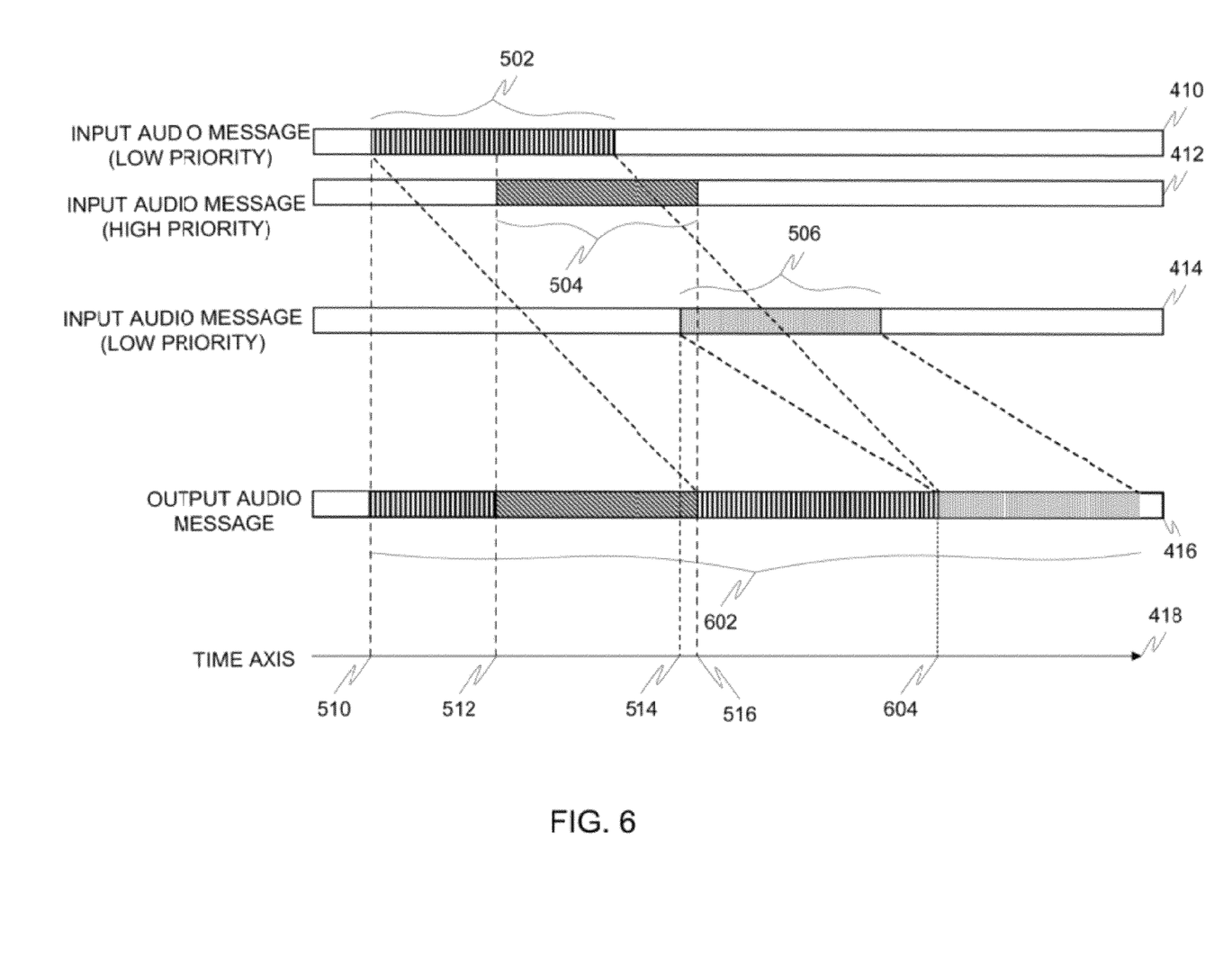
FIG. 6 sets out a diagram corresponding to an exemplary situation showing input audio messages and output audio messages in accordance with some embodiments.

FIG. 6 is a diagram showing the operation of an embodiment of the claimed invention in which the dispatch device 110 receives overlapping audio messages having an associated priority and forwards one message at a time based on the associated priority. Messages with a lower priority are pre-empted by messages with a higher priority, while lower priority messages are stored and forwarded later in their entirety. The dispatch device 110 receives the overlapping audio messages 502, 504, and 506 from the audio sources 104, 106, and 108 respectively and forwards output audio message 602.

The receiver 202 receives the audio message 502 at the time 510 from the audio source 104 and the processor 204 stores the audio message 502 in the buffer 206 and also forwards the audio message 502 to the reproduction components 210. At the time 512, the receiver 202 receives the audio message 504. As the priority of the audio message 504 is higher than the audio message 502, the processor 204 pre-empts the audio message 502 with the audio message 504 by forwarding the audio message 504 to the reproduction components 210. Simultaneously, the processor 204 stops forwarding the audio message 502 and continues storing the audio message 502 in the buffer 206. As above, the interruption can be preceded by a short time gap and/or may be provided with an audible indicator that indicates the message is being interrupted for a higher priority message.

At the time 514, the receiver 202 receives the audio message 506 and the processor 204 stores the audio message 506 in the buffer 206 while the audio message 504 is being reproduced. At the time 516, the audio message 504 has been reproduced in its entirety. Thereafter, the processor forwards the audio message 502 in its entirety from the buffer 206 to the reproduction components 210. A user may manually set the dispatch device 200 to select whether to reproduce the audio message 502 in its entirety or to reproduce only the remaining portion of the audio message 502. At time 604, the audio message 502 in its entirety is fully reproduced; thereafter, the processor 204 forwards the audio message 506 from the buffer 206 to the reproduction components 210 such that a listener listening the output audio message 602 is able to clearly listen to the audio messages 502, 504 and 506, which are sequentially reproduced based on their priority.

Figure 7:
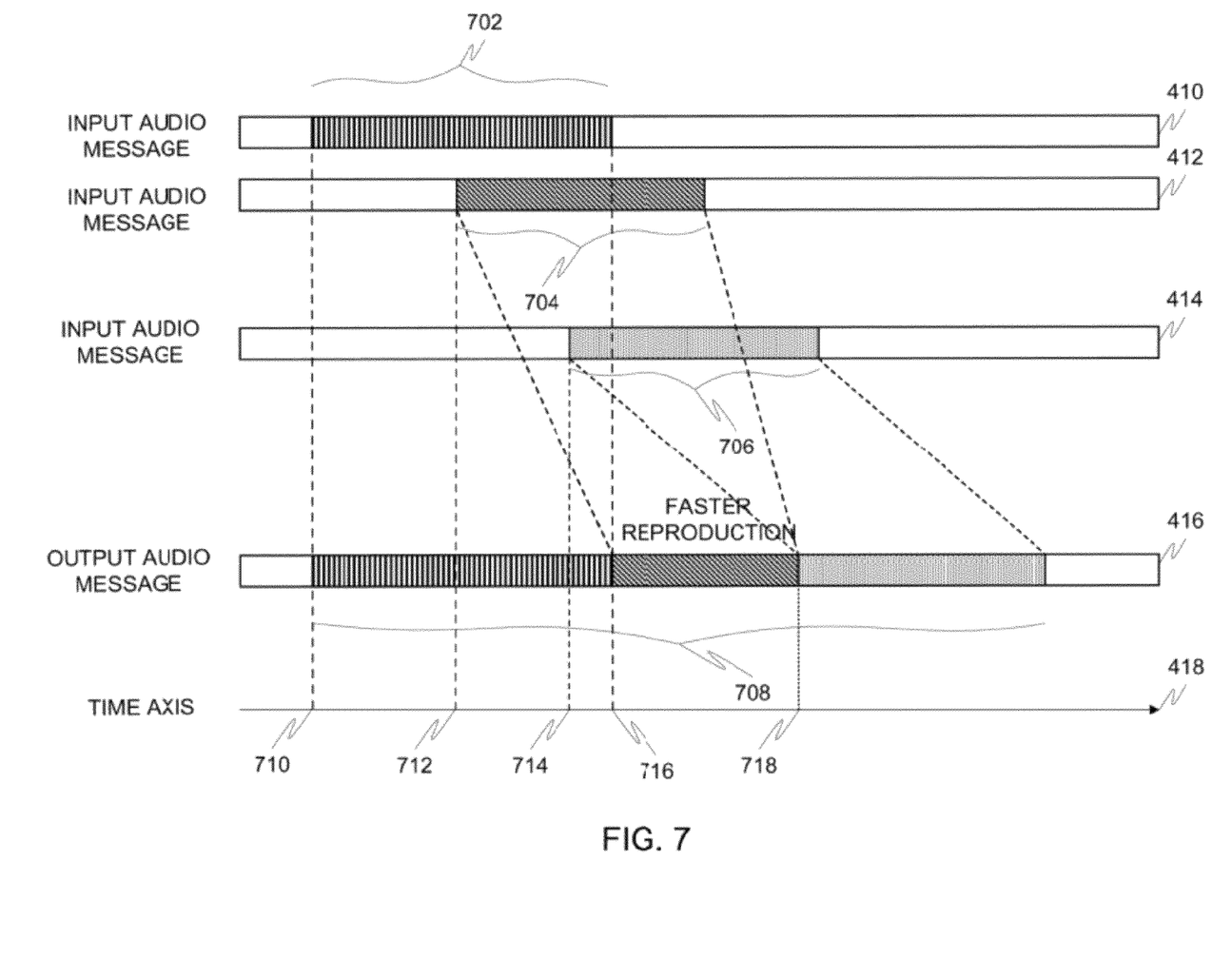
FIG. 7 sets out a diagram corresponding to an exemplary situation showing input audio messages and output audio messages in accordance with some embodiments.

FIG. 7 diagrams the operation of an embodiment of the claimed invention in which the dispatch device 110 receives overlapping audio messages and forwards the messages one at a time. Here, some of the messages are forwarded at an increased speed. The dispatch device 110 receives overlapping audio messages 702, 704, and 706 from the audio sources 104, 106, and 108 respectively and forwards output audio message 708.

The receiver 202 receives the audio message 702 at time 710 and the processor 204 forwards the audio message 702 to the reproduction components 210. At time 712, the receiver 202 receives the audio message 704 and the processor 204 stores the audio message 704 in the buffer 206 while the audio message 702 is being reproduced. Next, at time 714, the receiver 202 receives the audio message 706 and the processor 204 stores the audio message 706 in the buffer 206.

At time 716, the audio message 702 has been reproduced in its entirety; thereafter, the processor 204 forwards the audio message 704 from the buffer 206 to the reproduction components 210 at an increased speed, such that that reproduction of the audio message 704 is speeded up. The processor 204 may forward the audio message 704 up to about 10% faster than normal speed, such that the message is still intelligible and without distorting the message significantly. In one embodiment, when multiple simultaneous audio messages have been received which are to be forwarded, the processor forwards one or more of the audio messages at an increased speed. At time 718, the audio message 704 has been reproduced in its entirety; thereafter the processor 204 forwards the audio message 706 from the buffer 206 to the reproduction components 210 such that the sequential audio messages 702, 704, and 706 are able to be discerned without excessive problems due to distortion.

Figure 8:
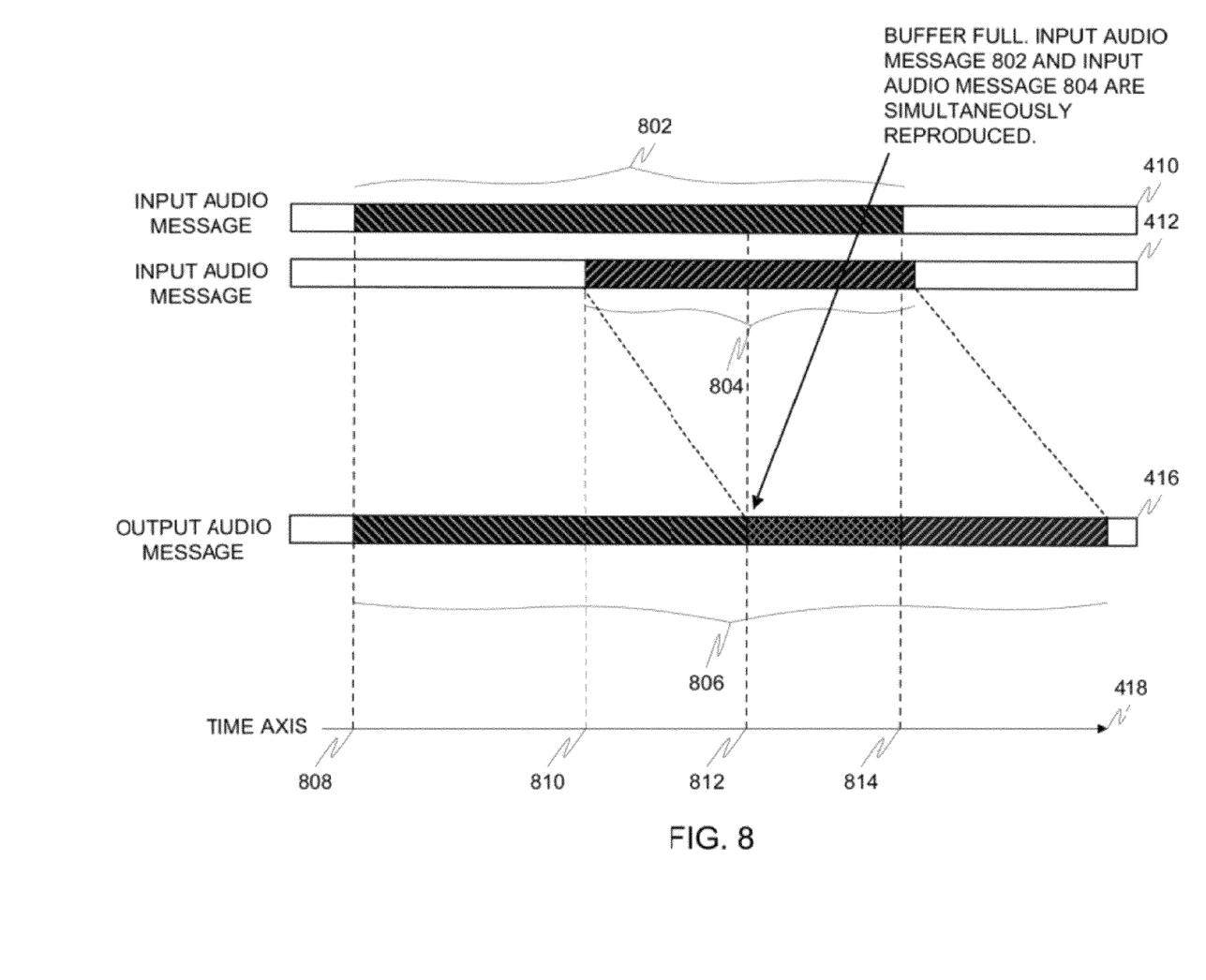
FIG. 8 sets out a diagram corresponding to an exemplary situation showing input audio messages and output audio messages in accordance with some embodiments.

FIG. 8 sets out a diagram showing the operation of an embodiment of the claimed invention in which the dispatch device 110 receives overlapping audio messages and forwards the messages one at a time until the buffer 206 is totally filled. Thereafter the audio messages are combined and reproduced simultaneously. The dispatch device 110 receives overlapping audio messages 802 and 804 from the audio sources 104 and 106 respectively and forwards output message 806. The receiver 202 receives the audio message 802 at time 808 and the processor 204 forwards the audio message 802 to the reproduction components 210.

At time 810, the receiver 202 receives the audio message 804 and the processor 204 stores the audio message 804 in the buffer 206 while the audio message 802 is still being reproduced. At time 812, the buffer 206 is totally filled. Thereafter, the processor 204 starts forwarding the audio message 804 to the reproduction components 210 even though the audio message 802 is still being reproduced. Thus, although the audio messages 802 and 804 are forwarded and reproduced simultaneously, the overlap is minimized. Methods by which the audio messages 802 and 804 are forwarded and reproduced simultaneously are known in the art and will not be described for brevity. At time 814, the audio message 802 has been reproduced in its entirety; thereafter, the reproduction components 210 reproduce the remaining part of the audio message 804.

If the audio messages have different priorities, the processor 204 may store the overlapping portion of the higher-priority audio message in an overlap buffer in the dispatch device 110. When one overlap buffer is full, or the lower priority audio message has been reproduced in its entirety, the processor 204 reforwards the higher priority audio message stored in the overlap buffer (or an overlapped portion thereof).

In another embodiment, reproduction volumes of the audio message 802 and the audio message 804 are set at different levels when the audio messages 802 and 804 are simultaneously reproduced. The volumes may be set automatically or using manual volume controls in the dispatch device 110. The volumes may be set automatically based on the sequence in which the audio messages are received, e.g., messages received earlier are played at a higher volume than ones received later. Alternatively, the volumes may be set automatically based on priority of the audio message, e.g., a higher priority audio message is played louder than a lower priority audio message, when both audio messages 802 and 804 are reproduced simultaneously. Finally, when the audio message 802 has been reproduced in its entirety, at time 814, the processor 204 restores original volume of the audio message 804 and forwards remaining part of the audio message 804 to the reproduction components 210.

Figure 9:
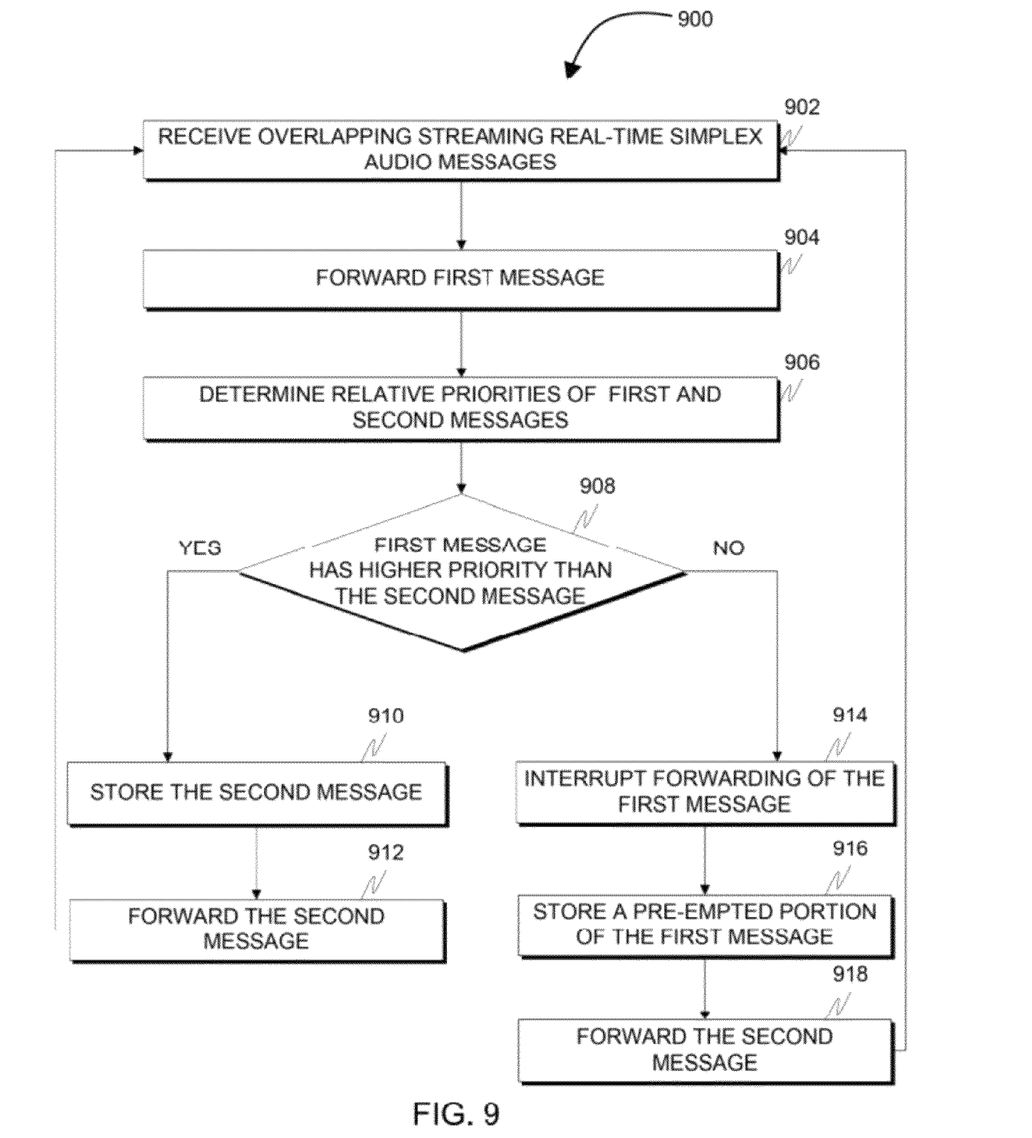
FIG. 9 is a flowchart of a method for minimizing message collision in the dispatch device in accordance with some embodiments.

FIG. 9 is a flowchart setting out an embodiment of a method 900 for minimizing real-time message collision in the dispatch device 110. This flowchart sets out method steps for forwarding messages based on priority of the messages, as discussed in connection with FIGS. 5 and 6 above. At step 902, two or more overlapping streaming real-time simplex audio messages are received at the receiver 202. A first audio message is received by the receiver 202 in the dispatch device 110 before a second audio message. Then at step 904, the processor 204 forwards the first audio message to the reproduction components 210. Thereafter, relative priorities of the first and second audio messages are determined at step 906, and the processor 204 checks whether the first audio message has a higher priority than the second audio message (step 908). If the first audio message has a higher priority than the second audio message, the processor 204 stores the second audio message in a second message buffer in step 910 and then, step 912, forwards the second audio message to the reproduction components after the earlier of forwarding of the first audio message has been completed or the second message buffer has been filled.

If the second audio message has a higher priority than the first audio message, however, then the processor 204 interrupts forwarding the first audio message to the reproduction components 210 at step 914 and then at step 916 stores a pre-empted portion of the first audio message in a first audio message buffer in the dispatch device 110. Finally, the processor 204 forwards the second audio message to the reproduction components 210 prior to the pre-empted portion being forwarded to the reproduction components at step 918. In one embodiment, the processor 204 forwards the pre-empted portion of the first audio message after the earlier of forwarding of the second audio message has been completed or the first audio message buffer has been filled. In another embodiment, the processor 204 forwards the pre-empted portion of the first audio message after a preset clock time after forwarding the first audio message has been interrupted or forwarding the second audio message has commenced. Further, when the second audio message has a higher priority than the first audio message, the processor 204 stores the first audio message in its entirety in the first audio message buffer and reforwards the first audio message in its entirety after the earlier of forwarding the second audio message is completed or filling first audio message buffer.

If forwarding the first and second audio messages overlap, the processor 204 stores an overlapping portion of the higher priority audio message in an overlap buffer in the dispatch device 110 and reforwards the overlapping portion after the earlier of completely forwarding the lower priority audio message or filling the overlap buffer. The processor 204 may also automatically set volumes of the first and second audio messages to different levels if forwarding the first and second audio messages overlap. The processor 204 may set the volumes based on priorities such that the volume of the higher priority audio message is louder than that of the lower priority audio message during the overlapping forwarding of the first and second audio messages.

In all of the embodiments shown, the first and second audio messages temporally overlap when received. The first and/or second audio messages are buffered and forwarded so that reproduction is essentially temporally adjacent (e.g., the first audio message is reproduced and the second message is then reproduced immediately or almost immediately after the first audio message has ended). However, each of the embodiments may be changed so that a preset time delay between reproduction of the first and second audio messages is present (i.e., reproduction of the first and second messages is no longer temporally adjacent). Such a time delay may be beneficial in permitting the listener enough time to operate effectively. For example, if the listener is an E911 operator, it may be desirable to space the first and second audio messages such that several seconds to a minute or so is provided between reproduction to allow notes to be taken, to dispatch an ambulance, etc. This time delay may be predetermined in the system or set by the listener, e.g., by an input on the dispatch console that indicates that listener is ready to accept the next E911 call. In the latter case, even if manually activated, there may be an automatic override after a certain time so that if the operator inadvertently forgets to restart the message reproduction, it starts automatically.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The individual features of the various embodiments shown in the figures and described in the text may be incorporated in different manners such that some of the features of one or more embodiments are provided in a different embodiment.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for minimizing message collision in an audio reproducing device, the method comprising:
  receiving, at the device, a plurality of overlapping streaming audio messages including at least a first audio message being received by the device before a different second audio message that at least partially overlaps the first audio message in time;
  forwarding, at the device, the first audio message to an audio reproduction component of the device for playback;

while forwarding the first audio message to the audio reproduction component, beginning receiving the second audio message and responsively determining, by the device, relative priorities of the first and second audio messages;
if the device determines that the first audio message has a higher priority than the second audio message:
continuing forwarding the first audio message to the audio reproduction component;
storing, at the device, the second audio message in a second message buffer; and
forwarding, at the device, the second audio message to the audio reproduction component after the earlier of: forwarding of the first audio message has been completed or the second audio message buffer has been filled; and
if the device determines that the second audio message has a higher priority than the first audio message:
interrupting and delaying, at the device, further forwarding of the first audio message to the audio reproduction component;
storing, at the device, subsequently received portions of the first audio message pre-empted by the higher priority second audio message in a first message buffer; and
forwarding, at the device, the second audio message to the audio reproduction component prior to forwarding the subsequently received portions of the first audio message to the audio reproduction component.

2. The method of claim 1, further comprising if the device determines that the second audio message has a higher priority than the first audio message:
storing, at the device, the first audio message in its entirety in the first message buffer; and
reforwarding, at the device, the first audio message in its entirety to the audio reproduction component after the earlier of forwarding of: the second audio message is completed or the first audio message buffer is filled.

3. The method of claim 1, further comprising after one of the first and second audio message buffers becomes filled, forwarding, at the device, both first and second audio messages to the audio reproduction component and automatically setting playback volumes of the first and second audio messages to different levels as a function of their relative priorities.

4. The method of claim 3, wherein the playback volume of the higher priority audio message of the first and second audio messages is set louder than that of the lower priority audio message of the first and second audio messages.

5. The method of claim 1, wherein reproduction of the first and second audio messages at the audio reproduction component is temporally adjacent.

6. The method of claim 1, wherein a preset time delay is inserted between reproduction of the first and second audio messages such that reproduction of the first and second audio messages is separated in time and not temporally adjacent.

7. The method of claim 1, wherein the device is an emergency dispatch console.

8. An audio reproducing device comprising:
a receiver configured to receive a plurality of overlapping streaming audio messages including at least a first audio message being received by the device before a different second audio message that at least partially overlaps the first audio message in time;
an audio reproduction component configured to play back audio messages;
a buffer configured to store audio messages; and
a processor configured to:
forward the first audio message, received via the receiver, to the audio reproduction component for playback;
while forwarding the first audio message to the audio reproduction component, beginning to receive, via the receiver, the second audio message and responsively determine relative priorities of the first and second audio messages;
if the processor determines that the first audio message has a higher priority than the second audio message:
continue to forward the first audio message to the audio reproduction component;
store the second audio message in the buffer; and
forward the second audio message to the audio reproduction component after the earlier of forwarding of the first audio message has been completed or the buffer has been filled; and
if the processor determines that the second audio message has a higher priority than the first audio message:
interrupt and delay further forwarding of the first audio message to the audio reproduction component;
store subsequently received portions of the first audio message pre-empted by the higher priority second audio message in the buffer; and
forward the second audio message to the audio reproduction component prior to forwarding the subsequently received portions of the first audio message to the audio reproduction component.

9. The device of claim 8, wherein the device is an emergency dispatch console.

10. The device of claim 8, wherein the processor is further configured, if the processor determines that the second audio message has a higher priority than the first audio message, to:
store, in the buffer, the first audio message in its entirety; and
reforward the first audio message in its entirety to the audio reproduction component after the earlier of forwarding of: the second audio message is completed or the buffer is filled.

11. The device of claim 8, wherein the processor is further configured to:
after the buffer becomes filled, forward both first and second audio messages to the audio reproduction component and automatically set playback volumes of the first and second audio messages to different levels as a function of their relative priorities.

12. The device of claim 11, wherein the playback volume of the higher priority audio message of the first and second audio messages is set louder than that of the lower priority audio message of the first and second audio messages.

13. The device of claim 8, wherein reproduction of the first and second audio messages at the audio reproduction component is temporally adjacent.

14. The device of claim 8, wherein a preset time delay is inserted between reproduction of the first and second audio messages such that reproduction of the first and second audio messages is separated in time and not temporally adjacent.

* * * * *